United States Patent [19]

Leung et al.

[11] Patent Number: 5,497,043

[45] Date of Patent: Mar. 5, 1996

[54] VIBRATION REDUCTION

[75] Inventors: Ronnie C. Leung, Gosport; Mark F. L. Harper, Cambridge, both of United Kingdom

[73] Assignee: The Secretary of State for Defence in Her Britannic Majesty's Government of the United Kingdom of Great Britain and Northern Ireland, London, England

[21] Appl. No.: 382,039

[22] PCT Filed: Aug. 6, 1993

[86] PCT No.: PCT/GB93/01673

§ 371 Date: Feb. 10, 1995

§ 102(e) Date: Feb. 10, 1995

[87] PCT Pub. No.: WO94/04844

PCT Pub. Date: Mar. 3, 1994

[30] Foreign Application Priority Data

Aug. 13, 1992 [GB] United Kingdom .................. 9217129

[51] Int. Cl.$^6$ .................................................. H01L 41/08
[52] U.S. Cl. ......................... 310/328; 310/326; 310/331; 310/367
[58] Field of Search ..................... 310/316, 326, 310/328, 331, 332, 367, 800

[56] References Cited

U.S. PATENT DOCUMENTS

| | | | |
|---|---|---|---|
| 3,570,476 | 3/1971 | Gregg | 128/24 |
| 3,816,774 | 6/1974 | Ohnuki et al. | 310/328 |
| 4,669,823 | 6/1987 | Iguma et al. | 380/255 |
| 4,674,331 | 6/1987 | Watson | 73/505 |
| 4,768,173 | 8/1988 | Gautier et al. | 310/337 |
| 4,849,668 | 7/1989 | Crawley et al. | 310/328 |
| 4,901,573 | 2/1990 | Srinivasan et al. | 73/579 |
| 4,918,666 | 4/1990 | Beauducel et al. | 310/800 |
| 4,940,914 | 7/1990 | Mizuno et al. | 310/326 |
| 4,947,434 | 8/1990 | Ito | 381/71 |
| 5,209,106 | 5/1993 | Carlin | 73/49.2 |

FOREIGN PATENT DOCUMENTS

| | | | |
|---|---|---|---|
| 2229789 | 10/1990 | United Kingdom | F16F 15/02 |
| 2256111 | 11/1992 | United Kingdom | H04R 17/00 |

OTHER PUBLICATIONS

"A New Type of Piezoelectric–Ceramic Hollow–Cylinder Torsional Vibrator" by H. Shimizu et al., pp. 104–105, Japanese Journal of Applied Physics vol. 29, Nov. 1989.

IBM Technical Disclosure Bulletin–"Electroacoustic Transducers for Optical Fiber Modulator and Tap" by F. G. Feller, vol. 21 No. 2 Jul. 1978, pp. 813 and 814.

Primary Examiner—Thomas M. Dougherty
Attorney, Agent, or Firm—Nixon & Vanderhye

[57] ABSTRACT

A cross axis actuator (1.1) for reducing the transmission of vibration along elongate members (1.2) comprising a series of windings (1.5, 1.6, 1.7, 1.8, 1.9, 1.10) wound helically at 30° pitch around the member (1.2) along part of its length in clockwise and anti-clockwise fashion and are anchored at two or more points (1.3, 1.4) to the member (1.2), the windings (1.5, 1.6, 1.7. 1.8, 1.9, 1.10) being able to be subjected to strain which causes deformation of the member (1.2) between attachment points (1.3, 1.4). The member (1.2) can be either a steel pipe or a rod. The windings (1.5, 1.6, 1.7, 1.8, 1.9, 1.10) can either be in the form of steel wires or be strips of material. The numbers of windings (1.5, 1.6, 1.7, 1.8, 1.9, 1.10) wound around the member (1.2) in a clockwise and anti-clockwise direction should be equal. Ideally, the windings (1.5, 1.6, 1.7, 1.8, 1.9, 1.10) are attached to the member (2) on a continuous basis except for the ends which are left free. The strain is generated from actuators, preferably made from piezo electric materials, which can either be attached to the ends of the windings (1.5, 1.6, 1.7, 1.8, 1.9, 1.10) or form part of the windings (1.5, 1.6, 1.7, 1.8, 1.9, 1.10). The actuators can be controlled by control signals which are calculated by a control unit based on signals produced by vibration sensors (1.13, 1.14). Ideally, part of the member (1.2) is formed to produce an impedance mismatch with the rest of the member (1.2). This can be achieved by having a flexible section (1.2a) within the member (1.2). The windings (1.5, 1.6, 1.7, 1.8, 1.9, 1.10) are usually attached across this section (1.2a).

27 Claims, 1 Drawing Sheet

20

VIBRATION REDUCTION

BACKGROUND OF THE INVENTION

The present invention relates to a method of vibration reduction and apparatus for the same based on the technique of cross axis actuation.

Discussion of Prior Art

Cross axis actuators are used for the active control of vibration in various pieces of apparatus, in particular elongate members, and operate to isolate vibration to a particular part of an apparatus by actively deforming an element along which undesirable vibrations are transmitted.

Various approaches to the active control of vibration transmitted along elongate members are known. UK patent application, publication number 2229789 discloses the use of a plurality of elongate and rigid actuators which are attached in parallel across a length of elongate member. The elongate member has flanges anchored to it at two points along its length and the actuators are then attached to the flanges. The actuators are movable via control signals originating from sensors so as to cause small deformation in the member between the points of flange attachment. This results in vibrational energy being reflected back towards its source. By attaching six actuators it is possible to control all possible low frequency vibrations which the member undergos, that is, longitudinal (compressional), transverse and torsional vibrational modes. In this case each flange has three attachment points for the actuators the attachment points on each flange being positioned at an angle of 120° to each other relative to the axis of the member. The relative attachment points on one flange to the other are offset by an angle of 60° with respect to the axis of the member. Each flange attachment point serves to attach two actuators these actuators being attached to the two closest attachment points on the other flange.

This design is however rather complex and costly. It also occupies a significant volume within the region of the flanges and this may hamper fitment of the device and its maintenance.

There is therefore a requirement for a simplified approach to the design of cross axis actuators occupies less space in the region of attachment.

SUMMARY OF THE INVENTION

According to the present invention there is provided a cross axis actuator for reducing the transmission of vibration along elongate members and the like which comprises a series of windings wound around the member along at least part of the members length in clockwise and anti-clockwise fashion and are anchored at two or more points to the member, the windings being subject to strain in order to cause deformation of the member in at least part of the regions between attachment points.

Preferably, the clockwork and anti-clockwork windings around the member are wound in a helical fashion.

Preferably, the pitch of the windings is at about 30° to the longitudinal axis of the elongate member, although this is not critical and other pitches may be adopted depending upon the degree of control of deformation required.

Typically the member will be a steel pipe or rod but the invention is not limited in this respect and may be used on a variety of structures which are capable of transmitting unwanted vibrations and to which the invention may reasonably be applied. The member could be a tube or pipe filled with a fluid. In such a case, it is possible for the fluid to be either stationary or flowing in a particular direction through the pipe.

Preferably, the windings are provided in the form of wires which are ideally formed from steel. Alternatively, strips of material can be used for the windings. Ideally, the numbers of windings wound around the member in a clockwise and anti-clockwise direction are equal.

Whilst the windings may be attached to the member at the minimum two points it is preferred that they are attached to the member on a continuous basis with the exception of having the ends of the windings free.

The strain generated in the windings can be provided in various ways. There are two preferred options. One option is to provide the strain in the windings by attaching at least one actuator to at least one end of the windings. In this case, the actuator can also serve to anchor one end of the windings to the member. The other option is to provide the strain by having at least part of the windings as actuators.

Conveniently, the actuators are formed from piezo electric materials, a preferred composition for which being polyvinylidenefluoride (PVDF). Where an actuator is provided at one end of the windings, it is preferable that it is a piezo ceramic bimorph actuator. In such a case the windings may conveniently be formed from steel wire.

The manner of overlap of the various windings is not critical as the amount of movement which they undergo is small. All that is required is that no residual strains remain in the windings between operations.

The actuator is best utilised when it includes the further addition of a sensing means which monitors the vibrations of the member and then generates signals which are a function of the vibrational movement, and a control unit which converts the generated signals into control signals for the actuators. Ideally, the sensing means comprises at least one vibration sensor attached to the member.

The vibration sensors could comprise transducers which would measure the vibration of the member and produce signals which are a function of the vibration. The control unit would collate and process the signals to produce the appropriate control signals for the cross axis actuator which would then generate strain within the windings in such a manner as to counteract the vibration.

In a particularly preferred embodiment of the present invention, at least part of the member is formed to produce an impedance mismatch with respect to the remainder of the member. Typically, this is produced by having a section of the member which is of different flexibility relative to the remainder of the member. This can be produced by the introduction of a separate section or the modification of part of the member either during manufacture or by modification of an existing member. Preferably the section is more flexible than the rest of the member. A suitable material for the flexible section would be reinforced rubber.

Preferably, the windings are attached across at least part of the section formed with the impedance mismatch with respect to the remainder of the member and ideally across its entire length.

The incorporation of a flexible section into the member is particularly useful in preventing the transmission of higher frequency vibration whereas the helical arrangement acts to suppress vibrations of lower frequency. The lowest effective frequency of operation for the flexible section will be governed by its stiffness. The combination of the flexible section and helical arrangement therefore provides a complementary arrangement which prevents or suppresses vibration over a much wider frequency range than the conventional techniques for the active control of vibration.

Provided enough windings are utilised the present invention can control vibrations to six degrees of freedom.

In a further embodiment, when the present invention is used in relation to a fluid filled pipe, there is a seventh degree of freedom which can also be controlled by application of an appropriate noise source output to the pipe. The appropriate noise source can be extra windings around the member.

According to a yet further embodiment of the present invention there is a method for the active control of vibration in an elongate member using a cross axis actuator comprising a series of windings wound around the member along at least part of the members length in clockwise and anti-clockwise fashion and are anchored to the member at two or more points wherein the windings are subject to strain to deform the member in at least part of the regions between the attachment points.

Preferably, the method further includes the step of varying the strain in order to vary the deformation of the member in such a way that it counteracts the vibration within the member.

Ideally, the strain is varied by at least one actuator, the actuators either being attached to at least one of the ends of the windings or forming at least part of the windings, the actuators being controlled using control signals.

It is possible to generate the control signals for the actuators by further including sensing means which monitors the vibration of the member and then generate signals which are a function of the vibration and a control unit which converts the generated signals into control signals.

Other embodiments of the cross axis actuator will be apparent from the description.

The invention has utility in many applications including the reduction of vibrations through sensitive transmission and receiving communications equipment such as satellite dishes and antennae.

BRIEF DESCRIPTION OF THE DRAWINGS

The invention will now be described by way of example only and with reference to the accompanying drawing, of which.

DETAILED DISCUSSION OF PREFERRED EMBODIMENTS

Figure 1:
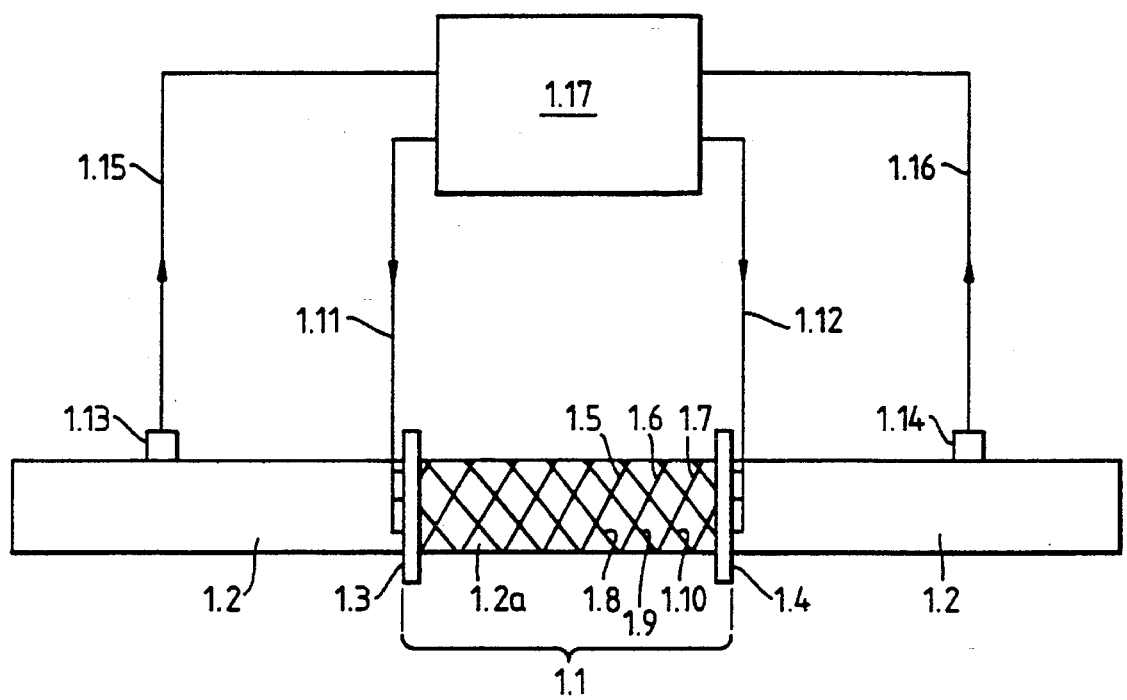
FIG. 1 shows a cross axis actuator with polyvinylidene-fluoride (PVDF) wires.
Figure 2:
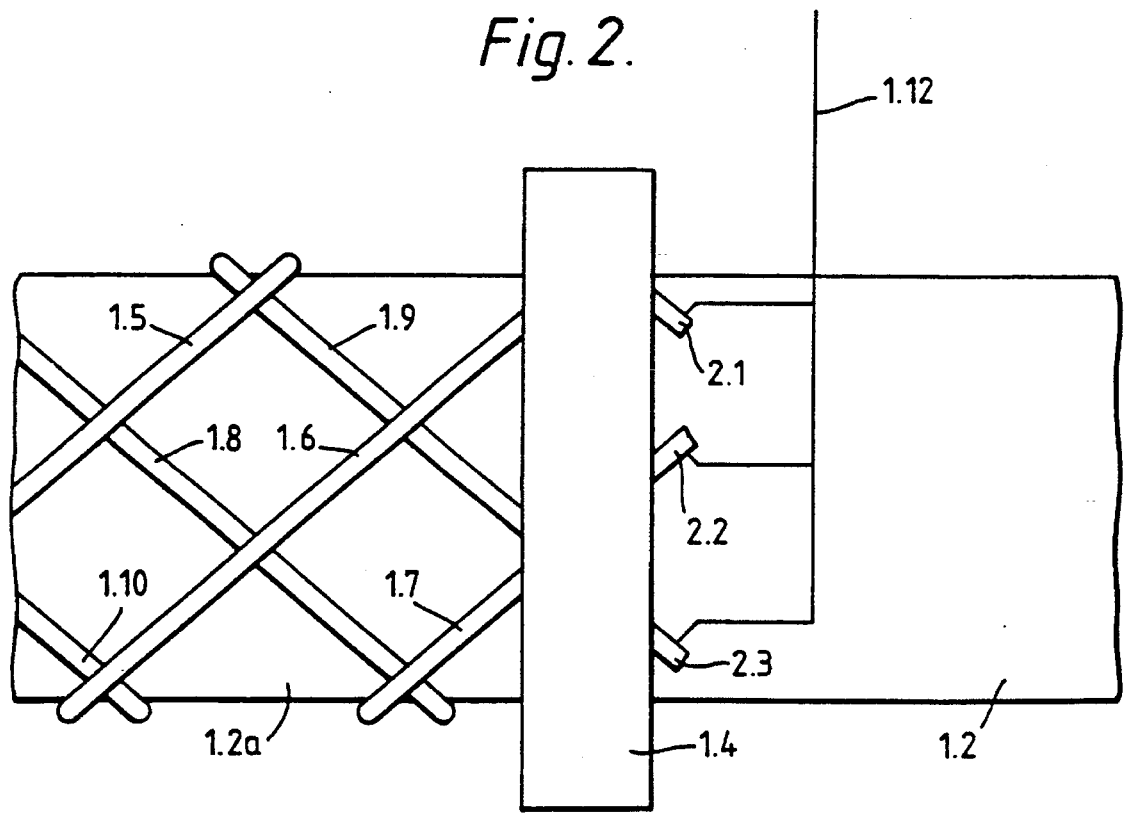
FIG. 2 shows a close up view of one of the steel ring sections of the cross axis actuator.

A cross axis actuator, 1.1, for use with a steel pipe, 1.2, possessing a central reinforced rubber section, 1.2a, comprises two steel rings, 1.3, 1.4, fixed in position around the pipe, 1.2, at the interfaces with the central reinforced rubber section, 1.2a, and the steel pipe, 1.2. See FIG. 1. Disposed between the rings, 1.3, 1.4, and anchored to them are 6 PVDF wires, 1.5, 1.6, 1.7, 1.8, 1.9, 1.10. The PVDF wires, 1.5, 1.6, 1.7, 1.8, 1.9, 1.10, form the actuators. When the appropriate stimulus is made to the wires, 1.5, 1.6, 1.7, 1.8, 1.9, 1.10, they contract in length. Loose PVDF wire ends, 2.1, 2.2, 2.3, extend outside the inter-ring space, 1.2a, and facilitate the easy connection of the PVDF wires, 1.5, 1.6, 1.7, 1.8, 1.9, 1.10, to signal wires, 1.11, 1.12, which supply the stimulus signals. See FIG. 2. Three of the wires, 1.5, 1.6, 1.7, equally displaced from one another about the section, 1.2a, are wound around the section, 1.2a, in helices of the same pitch and direction. The other three wires, 1.8, 1.9, 1.10, similarly displaced relative to each other are wound around the section, 1.2a, in opposite direction to the other three wires, 1.5, 1.6, 1.7, but with the same pitch. Attached to the steel pipe, 1.2, on either side of section are vibration sensors, 1.13, 1.14. The vibration sensors, 1.13, 1.14, monitor the vibrational movement of the steel pipe, 1.2, and generate signals which are a function of the movement. These signals are then fed via wires, 1.15, 1.16, to a control unit, 1.17. The control unit, 1.17, processes the signals and generates control signals which provide the correct stimulus for the PVDF wipes, 1.5, 1.6, 1.7, 1.8, 1.9, 1.10, to deform the pipe in such a way as to counteract the vibration in the steel pipe, 1.2. The control signals ape fed via wipes, 1.11, 1.12, to the loose ends, 2.1, 2.2, 2.3, of the PVDF wires, 1.5, 1.6, 1.7, 1.8, 1.9, 1.10. The vibration sensors, 1.13, 1.14, the control unit, 1.17, and the PVDF wipes, 1.5, 1.6, 1.7, 1.8, 1.9, 1.10, form an active control feedback system which actively controls the movement of the steel pipe, 1.2, to counteract the vibration within it. The resulting deformation due to the contraction of the PVDF wipes, 1.5, 1.6, 1.7, 1.8, 1.9, 1.10, causes low frequency vibrations to be reflected back towards their origin whilst the flexible section, 1.2a, causes an impedance mismatch with regard to the steel pipe, 1.2, which reduces the higher frequency vibrations. The invention therefore acts over a wide frequency range.

We claim:

1. A cross axis actuator for reducing the transmission of vibration along an elongate member, said actuator comprising:

a series of windings wound around and along at least part of the elongate member in clockwise and anti-clockwise fashion and anchored at two or more points to the member, and means for subjecting said windings to strain, the windings being capable of being subjected to strain in order to cause deformation of the member in at least part of the regions between attachment points wherein at least part of the member is formed to produce an impedance mismatch with respect to the remainder of the member.

2. A cross axis actuator as claimed in claim 1 wherein the clockwork and anti-clockwork windings around the member are wound in a helical fashion.

3. A cross axis actuator as claimed in claim 2 wherein the pitch of the windings is at about 30° to the longitudinal axis of an elongate member.

4. A cross axis actuator as claimed in claim 1 wherein the member is a steel pipe or rod.

5. A cross axis actuator as claimed in claim 1 wherein the windings are at least partially formed of wires.

6. A cross axis actuator as claimed in claim 5 wherein the wires may conveniently be formed from steel.

7. A cross axis actuator as claimed in claim 1 wherein strips of material are used for the windings.

8. A cross axis actuator as claimed in claim 1 wherein the numbers of windings wound around the member in a clockwise and anti-clockwise direction are equal.

9. A cross axis actuator as claimed in claim 1 wherein the windings are attached to the member on a continuous basis with the exception of having the ends of the windings free.

10. A cross axis actuator as claimed in claim 1 wherein the means for subjecting said windings to strain is comprised of at least one actuator attached to at least one end of each winding.

11. A cross axis actuator as claimed in claim 10 wherein the strain in each winding is provided by at least one actuator attached to one end of the winding.

12. A cross axis actuator as claimed in claim 10 wherein the actuator serves to anchor one end of the windings to the member.

13. A cross axis actuator as claimed in claim 1 wherein said means for subjecting is comprised of at least parts of the windings as actuators.

14. A cross axis actuator as claimed in claim 10 wherein the actuators are formed from piezo electric materials.

15. A cross axis actuator as claimed in claim 14 wherein the piezo electric material is polyvinylidenefluoride.

16. A cross axis actuator as claimed in claim 10 wherein the actuator is a piezo ceramic bimorph actuator.

17. A cross axis actuator as claimed in claim 10 wherein it further includes sensing means which monitors the vibrations of the member and then generates signals which are a function of the vibrational movement, and a control unit which converts the generated signals into control signals for the actuators.

18. A cross axis actuator as claimed in claim 17 wherein the sensing means comprises at least one vibrational sensor attached to the member.

19. A cross axis actuator as claimed in claim 1 wherein the impedance mismatch is produced by a section of the member which is of different flexibility relative to the remainder of the member.

20. A cross axis actuator as claimed in claim 19 wherein the section is more flexible than the rest of the member.

21. A cross axis actuator as claimed in claim 20 wherein the flexible section is formed from reinforced rubber.

22. A cross axis actuator as claimed in claim 1 wherein the windings are attached across at least part of the section formed with an impedance mismatch with respect to the remainder of the member and ideally across its entire length.

23. A cross axis actuator as claimed in claim 1 wherein, when the member comprises a fluid filled pipe, additional windings are added to control the vibration in the seventh degree of freedom.

24. A method for the active control of vibration in an elongate member using a cross axis actuator comprising a series of windings wound around the member along at least part of the members length in clockwise and anti-clockwise fashion and are anchored to the member at two or more points at least part of the member being formed to produce an impedance mismatch with respect to the remainder of the member wherein the windings are subject to strain to deform the member in at least part of the regions between the attachment points.

25. A method for the active control of vibration as claimed in claim 24 wherein the further step of varying the strain in order to vary the deformation of the member in such a way that it counteracts the vibration within the member.

26. A method for the active control of vibration as claimed in claim 25 wherein the strain is varied by at least one actuator, the actuators either being attached to at least one of the ends of the windings or forming at least part of the windings, the actuators being controlled using control signals.

27. A method for active control of vibration as claimed in claim 26 wherein the further steps of a sensing means monitoring the vibration of the member and then generating signals which are a function of the vibration, a control unit then converting the generated signals into control signals for the actuators, are included.

* * * * *